United States Patent
Lei et al.

(10) Patent No.: US 9,459,518 B2
(45) Date of Patent: Oct. 4, 2016

(54) PROJECTION APPARATUS AND IMAGE CALIBRATION METHOD THEREOF

(71) Applicants: LITE-ON ELECTRONICS (GUANGZHOU) LIMITED, Guangzhou (CN); Lite-On Technology Corporation, Taipei (TW)

(72) Inventors: Hua-De Lei, Taipei (TW); Chi-Hung Lin, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 14/596,222

(22) Filed: Jan. 14, 2015

(65) Prior Publication Data

US 2015/0227032 A1    Aug. 13, 2015

(30) Foreign Application Priority Data

Feb. 13, 2014   (CN) .......................... 2014 1 0049824

(51) Int. Cl.
*G03B 21/14*    (2006.01)
*G03B 21/53*    (2006.01)
*H04N 9/31*     (2006.01)

(52) U.S. Cl.
CPC ............ *G03B 21/147* (2013.01); *G03B 21/53* (2013.01); *H04N 9/3185* (2013.01); *H04N 9/3194* (2013.01)

(58) Field of Classification Search
CPC .. H04N 9/3194; H04N 9/3185; G03B 21/26; G03B 21/2053
See application file for complete search history.

(56) References Cited

U.S. PATENT DOCUMENTS

| | | | |
|---|---|---|---|
| 5,803,570 A * | 9/1998 | Chen .................... | H04N 9/3185 348/745 |
| 7,916,932 B2 * | 3/2011 | Lee ..................... | G01B 11/2513 353/34 |
| 2013/0057707 A1 * | 3/2013 | Hasegawa ............ | H04N 9/3194 348/189 |
| 2013/0093672 A1 * | 4/2013 | Ichieda .................. | G03B 21/26 345/157 |

* cited by examiner

*Primary Examiner* — Sultan Chowdhury
(74) *Attorney, Agent, or Firm* — Jianq Chyun IP Office

(57) ABSTRACT

A projection apparatus and an image calibration method thereof are provided. The image calibration method of the projection apparatus includes: transmitting N optical pulse signals to N calibration reference points on a projection plane respectively, wherein N is greater than or equal to 2; receiving N reflected optical pulse signals that are generated by reflecting the optical pulse signals; and respectively calculating time intervals between pulse waves of the optical pulse signals and the corresponding reflected optical pulse signals to obtain N time differences, thereby performing an image calibration.

9 Claims, 5 Drawing Sheets

PROJECTION APPARATUS AND IMAGE CALIBRATION METHOD THEREOF

CROSS-REFERENCE TO RELATED APPLICATION

This application claims the priority benefit of China application serial no. 201410049824.8, filed on Feb. 13, 2014. The entirety of the above-mentioned patent application is hereby incorporated by reference herein and made a part of this specification.

BACKGROUND OF THE INVENTION

1. Field of the Invention

The invention relates to a projection apparatus and an image calibration method thereof, and particularly relates to a keystone correction method for an image projected by the projection apparatus.

2. Description of Related Art

With the progress of the electronic technology, electronic devices have become indispensable in our daily lives. One important function of the electronic devices, which is being developed now, is to achieve information exchange and communication through image projection provided by the electronic devices.

In order to meet the needs of portability, a pico-projector that can be configured in a handheld electronic apparatus has been proposed. Unlike the conventional stationary projection apparatus, the pico-projector is easy to carry with and can perform image projection in any location at any time. However, compared to the stationary projection apparatus, problems such as image shaking or deformation may easily occur on the pico-projector disposed in the handheld electronic device due to the shaking of the hand that holds the electronic device. Therefore, how to effectively solve the problem of image shaking or deformation resulting from the shaking of the hand is an issue that needs to be overcome.

SUMMARY OF THE INVENTION

The invention provides a projection apparatus and an image calibration method thereof for dynamically and instantly performing a keystone correction of an image on the projected image.

The projection apparatus of the invention is adapted to generate an image on a projection plane. The image calibration method of the projection apparatus includes steps of: respectively transmitting N optical pulse signals to N calibration reference points of the projection plane, wherein N is greater than or equal to 2; receiving N reflected optical pulse signals that are generated by reflecting the optical pulse signals; and respectively calculating time intervals between pulse waves of the optical pulse signals and the corresponding reflected optical pulse signals to obtain N time differences, thereby performing an image calibration.

In an embodiment of the invention, at least two of the calibration reference points are disposed along a horizontal axis of the projection plane.

In an embodiment of the invention, at least two of the calibration reference points are disposed along a vertical axis of the projection plane.

In an embodiment of the invention, the step of respectively calculating the time intervals between the pulse waves of the optical pulse signals and the corresponding reflected optical pulse signals to obtain the time differences includes: respectively calculating time intervals between rising edges of the pulse waves of the optical pulse signals and rising edges of the pulse waves of the corresponding reflected optical pulse signals to obtain the time differences.

In an embodiment of the invention, the step of respectively calculating the time intervals between the pulse waves of the optical pulse signals and the corresponding reflected optical pulse signals to obtain the time differences includes: respectively calculating time intervals between falling edges of the pulse waves of the optical pulse signals and falling edges of the pulse waves of the corresponding reflected optical pulse signals to obtain the time differences.

In an embodiment of the invention, the N calibration reference points include a first calibration reference point, a second calibration reference point, a third calibration reference point, and a fourth calibration reference point that are located at four corners of the projection plane corresponding to the image.

In an embodiment of the invention, the step of respectively transmitting the optical pulse signals to the calibration reference points of the projection plane includes: respectively transmitting a first optical pulse signal, a second optical pulse signal, a third optical pulse signal, and a fourth optical pulse signal to the first calibration reference point, the second calibration reference point, the third calibration reference point, and the fourth calibration reference point, wherein a first reflected optical pulse signal, a second reflected optical pulse signal, a third reflected optical pulse signal, and a fourth reflected optical pulse signal are respectively generated by reflecting the first optical pulse signal, the second optical pulse signal, the third optical pulse signal, and the fourth optical pulse signal.

In an embodiment of the invention, the steps of respectively calculating the time intervals between the pulse waves of the optical pulse signals and the corresponding reflected optical pulse signals to obtain the time differences and performing the image calibration based on the time differences include: respectively calculating the time intervals between the first to the fourth optical pulse signals and the first to the fourth reflected optical pulse signals to obtain the time differences, and performing a keystone calibration of the image on the projection apparatus based on the time differences.

The projection apparatus of the invention includes an optical pulse signal transceiver and a controller. When the projection apparatus generates an image on a projection plane, the optical pulse signal transceiver transmits N optical pulse signals to N calibration reference points of the projection plane respectively, wherein N is greater than or equal to 2. The optical pulse signal transceiver further receives N reflected optical pulse signals generated by reflecting the optical pulse signals. The controller is coupled to the optical pulse signal transceiver. The controller respectively calculates time intervals between pulse waves of the optical pulse signals and the corresponding reflected optical pulse signals to obtain N time differences and performs an image calibration based on the time differences.

Based on the above, the invention transmits the optical pulse signals to multiple calibration reference points on the projection plane and receives the corresponding reflected optical pulse signals, and then calculates the optical pulse signals and the corresponding reflected optical pulse signals to obtain the distances that the projection apparatus projects display data to multiple calibration reference points on the projection plane. Based on the differences between the distances, the image projected by the projection apparatus can be calibrated instantly to maintain the display quality.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
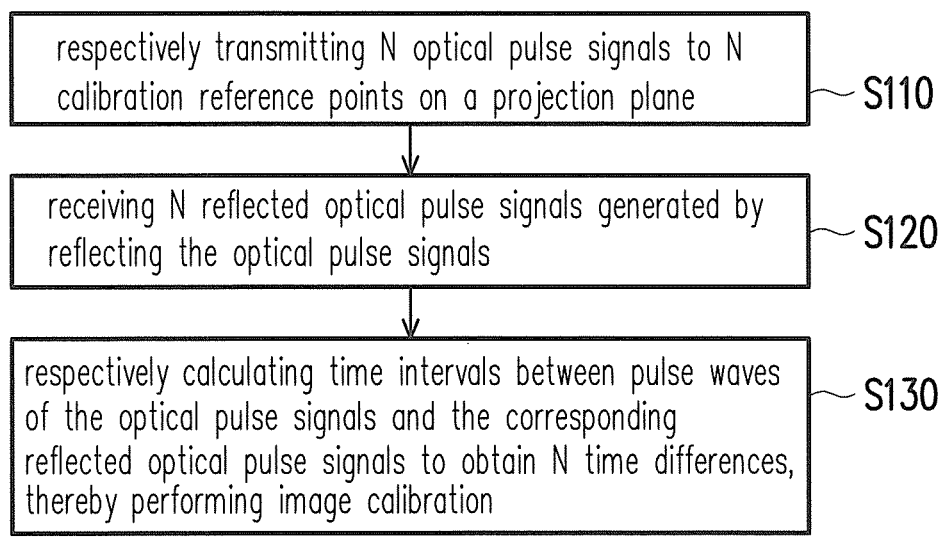
FIG. 1 is a flowchart illustrating an image calibration method of a projection apparatus according to an embodiment of the invention.
Figure 2:
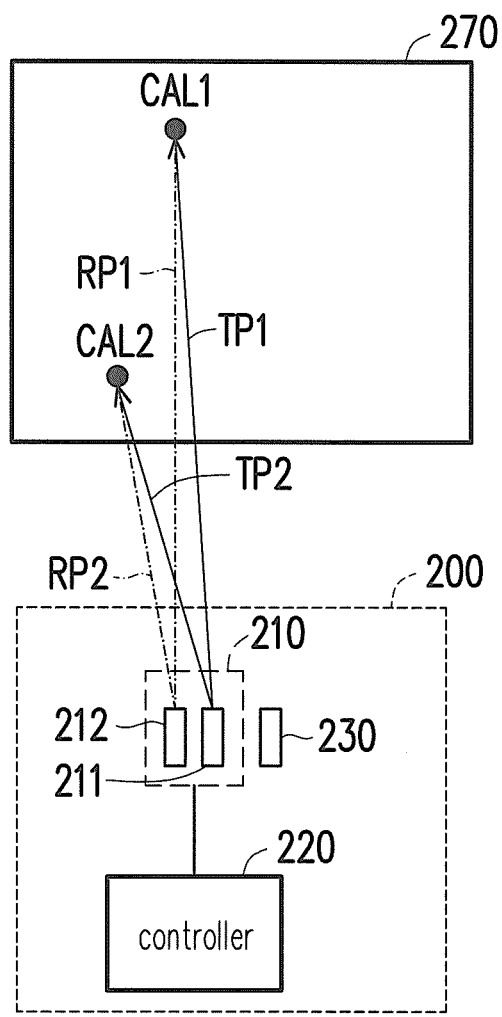
FIG. 2 is a schematic diagram illustrating an image calibration performed by a projection apparatus according to an embodiment of the invention.

With reference to FIG. 1 and FIG. 2, FIG. 1 is a flowchart illustrating an image calibration method of a projection apparatus according to an embodiment of the invention, and FIG. 2 is a schematic diagram illustrating an image calibration performed by the projection apparatus according to an embodiment of the invention. A projection apparatus 200 includes an optical pulse signal transceiver 210, a controller 220, and a projection system 230. The projection apparatus 200 generates an image on a projection plane 270 by the projection system 230. According to the image calibration method, in Step S110, when the projection system 230 generates the image on the projection plane 270, the optical pulse signal transceiver 210 transmits N optical pulse signals to N calibration reference points on the projection plane 270 respectively, wherein N is greater than or equal to 2. In the embodiment of FIG. 2, the optical pulse signal transceiver 210 transmits two optical pulse signals TP1 and TP2 respectively to two calibration reference points CAL1 and CAL2 on the projection plane 270. The calibration reference point CAL1 corresponds to the optical pulse signal TP1 and the calibration reference point CAL2 corresponds to the optical pulse signal TP2.

Moreover, when the optical pulse signals TP1 and TP2 reach the projection plane 270, the optical pulse signals TP1 and TP2 are reflected to generate reflected optical pulse signals RP1 and RP2 respectively. In Step S120, the optical pulse signal transceiver 210 receives the reflected optical pulse signals RP1 and RP2, wherein the number of the reflected optical pulse signals RP1 and RP2 is equal to the number of the optical pulse signals TP1 and TP2 that have been transmitted.

In this embodiment, the optical pulse signal transceiver 210 includes an optical pulse signal transmitter 211 and an optical pulse signal receiver 212. The optical pulse signal transmitter 211 is configured to send the optical pulse signals TP1 and TP2, and the optical pulse signal receiver 212 is configured to receive the reflected optical pulse signals RP1 and RP2. In other embodiments of the invention, the optical pulse signal transceiver 210 may be constructed with one single duplex device that is capable of receiving or transmitting the optical pulse signals. In addition, the optical pulse signal transceiver 210 may be an infrared transceiver. In another embodiment, the optical pulse signal transmitter 211 may be included in the projection system 230. More specifically, the projection system 230 generally includes a light source module for emitting light beams of different colors (e.g. red, green, and blue; three colors RGB) and combining the light beams into an image light beam. In this embodiment, the light source module of the projection system 230 is further used for sending the optical pulse signals. For example, the light source module of the projection system 230 may further include an infrared light source that emits infrared light as the optical pulse signal transmitter 211.

Figure 3A:
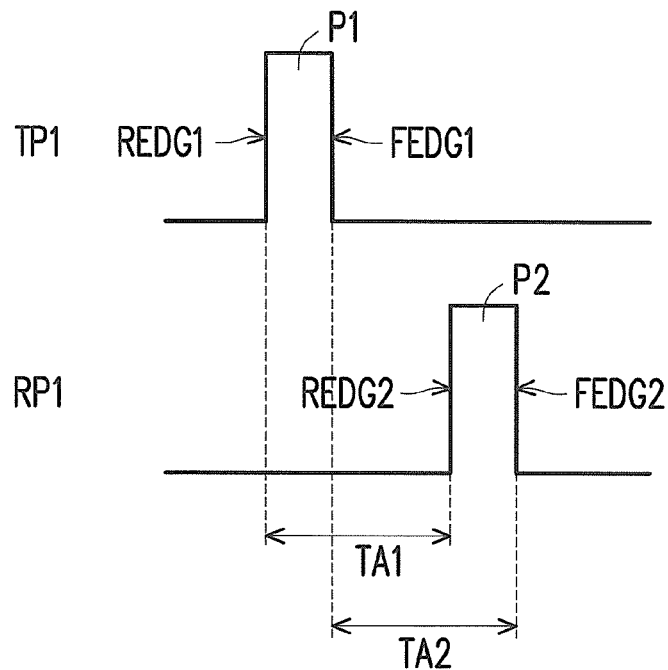
FIG. 3A is a diagram illustrating waveforms of an optical pulse signal TP1 and a reflected optical pulse signal RP1.

Further to the above, in Step S130, the controller 220 respectively calculates time intervals between pulse waves of the optical pulse signals TP1 and TP2 and the corresponding reflected optical pulse signals RP1 and RP2 so as to obtain a plurality of time differences and perform image calibration based on the time differences. In the embodiment, the optical pulse signals TP1 and TP2 may be pulse signals having one pulse wave, and the reflected optical pulse signals RP1 and RP2 are pulse signals having one pulse wave as well. With reference to FIG. 3A, FIG. 3A is a diagram illustrating waveforms of the optical pulse signal TP1 and the reflected optical pulse signal RP1. The optical pulse signal TP1 has a pulse wave P1 and the reflected optical pulse signal RP1 has a pulse wave P2. When calculating the time interval between the pulse wave P1 of the optical pulse signal TP1 and the pulse wave P2 of the corresponding reflected optical pulse signal RP2, the controller 220 calculates a time interval TA1 between a rising edge REDG1 of the pulse wave P1 of the optical pulse signal TP1 and a rising edge REDG2 of the pulse wave P2 of the reflected optical pulse signal RP1 to complete the calculation. In other embodiment, the controller 220 may also calculate a time interval TA2 between a falling edge FEDG1 of the pulse wave P1 of the optical pulse signal TP1 and a falling edge FEDG2 of the pulse wave P2 of the reflected optical pulse signal RP1.

Figure 3B:
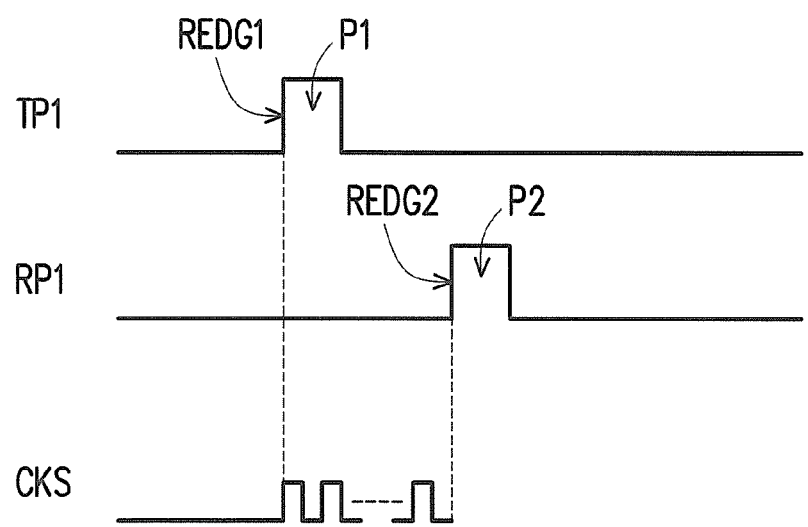
FIG. 3B illustrates an embodiment of a calculating method of calculating a time interval between pulse waves according to the invention.

Regarding details of carrying out the calculation of the time interval, please refer to FIG. 3B. FIG. 3B illustrates an embodiment of a calculating method of calculating the time interval between the pulse waves according to the invention. In FIG. 3B, the controller 220 uses a sampling clock signal CKS to perform sampling between the rising edge REDG1 of the pulse wave P1 and the rising edge REDG2 of the pulse wave P2. More specifically, a counting operation using the sampling clock signal CKS is initiated when the rising edge REDG1 of the pulse wave P1 occurs, and the counting operation is stopped when the rising edge REDG2 of the pulse wave P2 occurs. Accordingly, the controller 220 obtains the time interval between the rising edge REDG1 of the pulse wave P1 and the rising edge REDG2 of the pulse wave P2 by means of the counting operation, and thereby obtains the time difference between the pulse wave P1 and the pulse wave P2.

Of course, the aforementioned counting operation may also be performed based on the falling edges of the pulse waves P1 and P2. Details thereof will not be repeated hereinafter.

Figure 4:
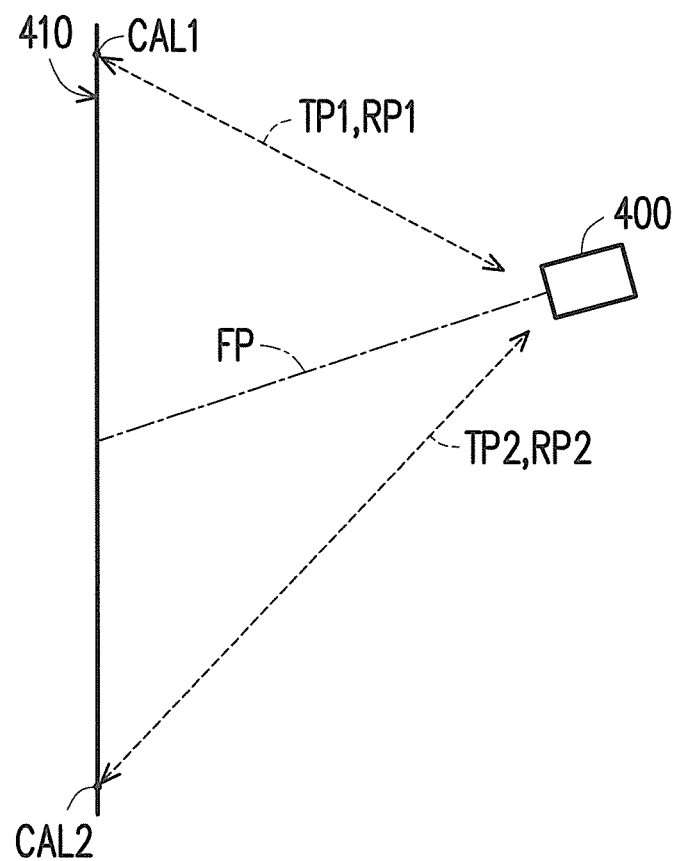
FIG. 4 is a schematic diagram illustrating a relationship between a pulse wave time difference, a projection apparatus, and a projection plane.

With reference to FIG. 4, FIG. 4 is a schematic diagram illustrating a relationship between the pulse wave time difference, the projection apparatus, and the projection plane. In FIG. 4, when a projection direction FP of an image generated by a projection apparatus 400 is not perpendicular to a projection plane 410, traveling distances of the optical pulse signal TP1 projected to the calibration reference point CAL1 and the reflected optical pulse signal RP1 are different from traveling distances of the optical pulse signal TP2 projected to the calibration reference point CAL2 and the reflected optical pulse signal RP2. By respectively calculating the time differences of the pulse waves of the optical pulse signals TP1 and TP2 and the corresponding reflected optical pulse signals RP1 and RP2, a total traveling distance of the optical pulse signal TP1 and the reflected optical pulse signal RP1 and a total traveling distance of the optical pulse signal TP2 and the reflected optical pulse signal RP2 are obtained to determine the respective distances between the calibration reference points CAL1 and CAL2 and the projection apparatus 400.

In the example of FIG. 4, the total traveling distance of the optical pulse signal TP1 and the reflected optical pulse signal RP1 is smaller than the total traveling distance of the optical pulse signal TP2 and the reflected optical pulse signal RP2. That is to say, the distance between the calibration reference point CAL1 and the projection apparatus 400 is smaller than the distance between the calibration reference point CAL2 and the projection apparatus 400. Thus, an image range displayed by the projection plane 410 on the top of FIG. 4 is smaller, and an image displayed by the projection plane 410 on the bottom of FIG. 4 is larger. As a result, the projection apparatus 400 requires a proper adjustment (e.g. adjusting an angle of image projection) to calibrate the projected image.

Figure 5A:
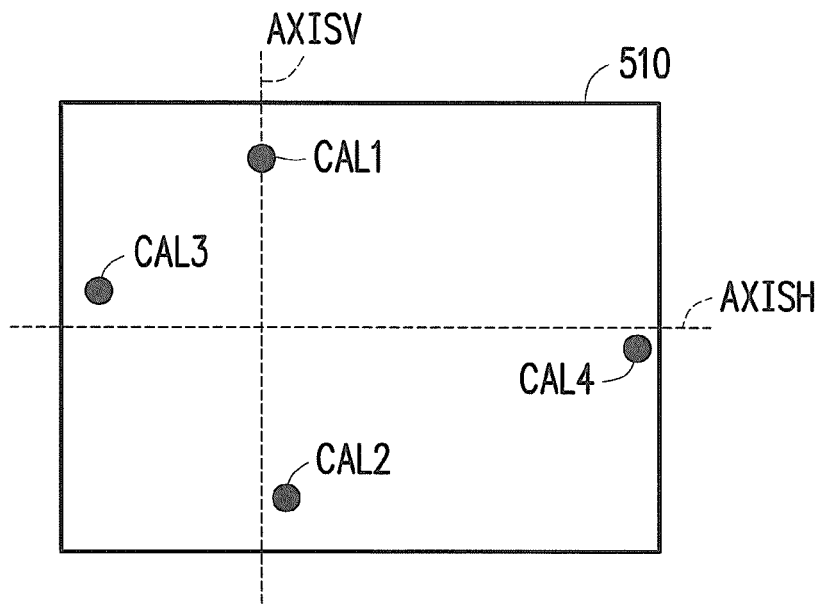
FIG. 5A and FIG. 5B illustrate embodiments of different arrangements of calibration reference points according to the invention.
Figure 5B:
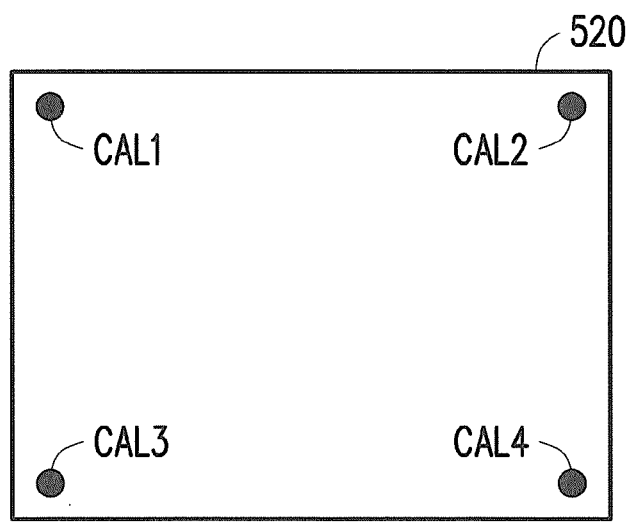

In this embodiment of the invention, each calibration reference point may be disposed at a random position on the projection plane. Through comparing the distances between the respective calibration reference points and the projection apparatus, calibration of the projected image can be carried out. Below please refer to FIG. 5A and FIG. 5B. FIG. 5A and FIG. 5B illustrate embodiments of different arrangements of the calibration reference points according to the invention. First, with reference to FIG. 5A, the number of the calibration reference points is at least two. Take the calibration reference points CAL1 and CAL2 as an example, the calibration reference points CAL1 and CAL2 are disposed along a vertical axis AXISV of the projection plane 510. The calibration reference point CAL1 is disposed on the vertical axis AXISV while the calibration reference point CAL2 is disposed near the vertical axis AXISV. Simply put, a line connecting the calibration reference point CAL1 and the calibration reference point CAL2 is almost parallel to the vertical axis AXISV. Here, the calibration reference points CAL1 and CAL2 are used to perform a keystone correction of the projected image in a vertical direction.

In addition, take the calibration reference points CAL3 and CAL4 as an example, the calibration reference points CAL3 and CAL4 are disposed along a horizontal axis AXISH of the projection plane 510. The calibration reference point CAL3 is disposed above and near the horizontal axis AXISH while the calibration reference point CAL4 is disposed below and near the horizontal axis AXISH. Simply put, a line connecting the calibration reference point CAL3 and the calibration reference point CAL4 is almost parallel to the horizontal axis AXISH. Here, the calibration reference points CAL3 and CAL4 are used to perform a keystone correction of the projected image in a transverse direction.

Of course, the number of the calibration reference points is not limited to two. The projection apparatus may project optical pulse signals to all the calibration reference points CAL1 to CAL4 or only three of the calibration reference points for performing calibration of the projected image.

In the embodiment of FIG. 5B, the calibration reference points CAL1 to CAL4 are respectively disposed at four corners of the projection plane 520 corresponding to the projected image. Accordingly, the projection apparatus obtains the distances between the projection apparatus and the four corners of the projection plane 510 through the four optical pulse signals transmitted to the calibration reference points CAL1 to CAL4 and the corresponding four reflected optical pulse signals. The keystone correction of the projection apparatus is performed based on the four distances, so as to optimize the projected image.

In conclusion of the above, the invention is to dispose multiple calibration reference points on the projection plane and utilize the projection of optical pulse signals to the calibration reference points. By measuring the time differences between the optical pulse signals and the corresponding reflected optical pulse signals, keystone correction can be carried out on the image projected by the projection apparatus, so as to dynamically and instantly maintain the quality of the projected image.

What is claimed is:

1. An image calibration method for a projection apparatus adapted to generate an image on a projection plane, the image calibration method comprising:
   respectively transmitting N optical pulse signals to N calibration reference points on the projection plane, wherein N is greater than or equal to 2, wherein the N calibration reference points comprise a first calibration reference point, a second calibration reference point, a third calibration reference point, and a fourth calibration reference point that are located at four corners of the projection plane corresponding to the image;
   respectively transmitting a first optical pulse signal, a second optical pulse signal, a third optical pulse signal, and a fourth optical pulse signal to the first calibration reference point, the second calibration reference point, the third calibration reference point, and the fourth calibration reference point;
   receiving a first reflected optical pulse signal, a second reflected optical pulse signal, a third reflected optical pulse signal, and a fourth reflected optical pulse signal respectively generated by reflecting the first optical pulse signal, the second optical pulse signal, the third optical pulse signal, and the fourth optical pulse signal;
   respectively calculating the time intervals between the first to the fourth optical pulse signals and the first to the fourth reflected optical pulse signals to obtain the time differences; and
   performing an image calibration based on the time differences.

2. The image calibration method according to claim 1, wherein the steps of performing the image calibration based on the time differences comprise:
   performing a keystone calibration of the image on the projection apparatus based on the time differences.

3. A projection apparatus, comprising:
   an optical pulse signal transceiver respectively transmitting N optical pulse signals to N calibration reference points on a projection plane when the projection apparatus generates an image on the projection plane, wherein N is greater than or equal to 2, and the optical pulse signal transceiver receiving N reflected optical pulse signals generated by reflecting the optical pulse signals; and a controller coupled to the optical pulse signal transceiver and respectively calculating time intervals between pulse waves of the optical pulse signals and the corresponding reflected optical pulse signals to obtain N time differences and performing an image calibration based on the time differences, wherein the N calibration reference points comprise a first calibration reference point, a second calibration reference point, a third calibration reference point, and a fourth calibration reference point that are located at four corners of the projection plane corresponding to the image, wherein the optical pulse signal transceiver respectively transmits a first optical pulse signal, a second optical pulse signal, a third optical pulse signal, and a fourth optical pulse signal to the first calibration reference point, the second calibration reference point, the third calibration reference point, and the fourth calibration reference point; and a first reflected optical pulse signal, a second reflected optical pulse signal, a third reflected optical pulse signal, and a fourth reflected optical pulse signal are respectively generated by reflecting the first optical pulse signal, the second optical pulse signal, the third optical pulse signal, and the fourth optical pulse signal.

4. The projection apparatus according to claim 3, wherein the optical pulse signal transceiver receives the first reflected optical pulse signal, the second reflected optical pulse signal, the third reflected optical pulse signal, and the fourth reflected optical pulse signal; and the controller respectively calculates the time intervals between the first to the fourth optical pulse signals and the first to the fourth reflected optical pulse signals to obtain the time differences and performs a keystone calibration of the image on the projection apparatus based on the time differences.

5. A projection apparatus, comprising:

an optical pulse signal transceiver respectively transmitting N optical pulse signals to N calibration reference points on a projection plane when the projection apparatus generates an image on the projection plane, wherein N is greater than or equal to 2, and the optical pulse signal transceiver receiving N reflected optical pulse signals generated by reflecting the optical pulse signals; and a controller coupled to the optical pulse signal transceiver and respectively calculating time intervals between pulse waves of the optical pulse signals and the corresponding reflected optical pulse signals to obtain N time differences and performing an image calibration based on the time differences, wherein the N calibration reference points comprise a first calibration reference point and a second calibration reference point, wherein the optical pulse signal transceiver respectively transmits a first optical pulse signal and a second optical pulse signal to the first calibration reference point and the second calibration reference point, and receives a first reflected optical pulse signal and a second reflected optical pulse signal respectively generated by reflecting the first optical pulse signal and the second optical pulse signal, wherein the controller respectively calculates the time intervals between the first to the second optical pulse signals and the first to the second reflected optical pulse signals to obtain the time differences.

6. The projection apparatus according to claim 5, wherein the first calibration reference point and the second calibration reference point are disposed along a horizontal axis of the projection plane.

7. The projection apparatus according to claim 5, wherein the first calibration reference point and the second calibration reference point are disposed along a vertical axis of the projection plane.

8. The projection apparatus according to claim 5, wherein the N calibration reference points further comprise a third calibration reference point and a fourth calibration reference point, where the first to the fourth calibration reference points are located at four corners of the projection plane corresponding to the image.

9. The projection apparatus according to claim 5, wherein the controller performs a keystone calibration of the image on the projection apparatus based on the time differences.

* * * * *